(12) United States Patent
Polychronakis

(10) Patent No.: US 10,317,016 B2
(45) Date of Patent: Jun. 11, 2019

(54) SEMICONDUCTOR RETROFIT LAMP WITH IMPROVED EMI CHARACTERISTICS

(71) Applicant: LEDVANCE GmbH, Garching bei Munchen (DE)

(72) Inventor: Orestis Polychronakis, Munich (DE)

(73) Assignee: LEDVANCE GMBH, Garching Bei München (DE)

( * ) Notice: Subject to any disclaimer, the term of this patent is extended or adjusted under 35 U.S.C. 154(b) by 0 days.

(21) Appl. No.: 15/865,411

(22) Filed: Jan. 9, 2018

(65) Prior Publication Data

US 2018/0231190 A1   Aug. 16, 2018

(30) Foreign Application Priority Data

Feb. 16, 2017   (DE) .................... 10 2017 103 184

(51) Int. Cl.
| | |
|---|---|
| *F21V 21/00* | (2006.01) |
| *F21K 9/278* | (2016.01) |
| *H05B 33/08* | (2006.01) |
| *F21V 23/00* | (2015.01) |
| *F21K 9/27* | (2016.01) |
| *F21V 23/02* | (2006.01) |
| *F21Y 115/10* | (2016.01) |
| *F21K 9/272* | (2016.01) |

(52) U.S. Cl.
CPC ......... *F21K 9/278* (2016.08); *H05B 33/0815* (2013.01); *F21K 9/27* (2016.08); *F21K 9/272* (2016.08); *F21V 23/005* (2013.01); *F21V 23/02* (2013.01); *F21Y 2115/10* (2016.08)

(58) Field of Classification Search
CPC ............. F21K 9/27; F21K 9/272; F21K 9/278

USPC ............... 362/217.01, 219, 221–222, 249.02
See application file for complete search history.

(56) References Cited

U.S. PATENT DOCUMENTS

| | | | |
|---|---|---|---|
| 2007/0228999 A1* | 10/2007 | Kit | ..................... H05B 33/0803 315/291 |
| 2010/0002424 A1 | 1/2010 | Lin et al. | |
| 2013/0104410 A1* | 5/2013 | Wade | ..................... G01C 17/28 33/361 |
| 2013/0313983 A1 | 11/2013 | Radermacher | |
| 2014/0239825 A1* | 8/2014 | Choi | ..................... H02M 1/44 315/186 |

(Continued)

FOREIGN PATENT DOCUMENTS

| | | |
|---|---|---|
| DE | 102009032804 A1 | 1/2011 |
| EP | 3096589 A2 | 11/2016 |

*Primary Examiner* — Thuy V Tran
(74) *Attorney, Agent, or Firm* — Hayes Soloway PC

(57) ABSTRACT

A lighting device has a housing, a light engine located in the housing with a printed circuit board (PCB) and one or more light emitting diodes (LEDs) arranged on the PCB, and an electronic driver for controlling the LEDs. The electronic driver includes a first driver part located at a first position in the housing and a second driver part located at a second position in the housing, the first driver part is electrically connected to the second driver part via a pair of electrically conductive traces on the PCB. The lighting device includes one or more capacitive devices arranged along the pair of electrically conductive traces connecting the first driver part and the second driver part. Each capacitive device is connected with a first terminal to a first trace and a second terminal to a second trace.

20 Claims, 5 Drawing Sheets

(56) References Cited

U.S. PATENT DOCUMENTS

| | | | |
|---|---|---|---|
| 2015/0351171 A1* | 12/2015 | Tao | .................. H05B 37/02 |
| | | | 315/185 R |
| 2016/0081147 A1 | 3/2016 | Guang | |
| 2016/0174307 A1* | 6/2016 | Tao | .................. H05B 33/0809 |
| | | | 315/85 |

* cited by examiner

SEMICONDUCTOR RETROFIT LAMP WITH IMPROVED EMI CHARACTERISTICS

CROSS-REFERENCE TO RELATED APPLICATIONS AND PRIORITY

This patent application claims priority from German Patent Application No. 102017103184.7 filed on Feb. 16, 2017. This patent application is herein incorporated by reference in its entirety.

TECHNICAL FIELD

The present invention relates to a driving circuit for LED lamps, in particular for retrofit tube lamps (for example T5 and T8 format).

BACKGROUND

Fluorescent tube lamp are being more and more replaced by retrofit tube lamps employing semiconductor light emitting elements (light emitting diodes, LEDs). Luminaires can drive the fluorescent tube lamp using either an electronic control gear (ECG) or a conventional control gear (CCG). Retrofit tube lamps for replacing fluorescent tube lamps in a luminaire with CCG require a driver in the form of a switched-mode power supply (SMPS) to provide the LEDs in the lamp with the required operating parameters (voltage, current, power).

The physical size of such a SMPS driver can be rather big due to various application requirements (high power factor, big input filters, wireless functionality, etc.). Therefore, the driver may be split in two parts which are arranged in the two endcaps of a retrofit tube lamp. The two driver parts are then electrically connected, for example by way of traces on the printed circuit board (PCB) which also carries the LEDs. The PCB carrying the LEDs is often referred to as light engine. The output of the driver is fed to the light engine (and, thus, to the LEDs), for example in the middle of the light engine.

The length of the traces connecting the two driver parts (depending on the size of the retrofit lamp, this may be more than 1 m) lead to stray inductances that are formed along the traces. In case that a metal element is present near the traces along their length, for example the lamp housing, a heatsink, a ground metal plate, etc.), stray capacitances may be formed as well.

The SMPS driver for LED retrofit lamps is usually operated in boundary conduction mode, i.e. the current in certain portions of the driver may quickly switch between a maximum value and approximately zero. If the splitting of the SMPS driver into two parts occurs at such a portion of the driver, the high current peaks travelling along a PCB trace connecting the two driver parts may interact with the stray inductances causing voltage fluctuations along the PCB trace.

The voltage fluctuations may interact with the stray capacitances and cause stray currents through the stray capacitances that end up in the metal element (e.g., ground metal plate). These voltage fluctuations and stray currents may increase the electromagnetic interference (EMI) generated by the lamp, in particular in the frequency range of 9 kHz to 30 MHz (conducted EMI), but also in the frequency range of 30 MHz to 300 MHz (emitted EMI). This can make it difficult for the retrofit lamp to stay within statutory and regulatory limits applicable for EMI.

It is, therefore, an object of the present invention to provide LED retrofit lamps which overcome the problems discussed above.

SUMMARY OF THE INVENTION

In view of the known prior art, it is an object of the present invention to provide a lighting device, in particular an LED retrofit lamp, with reduced electromagnetic interference.

This object is solved by a lighting device according to the independent claim. Preferred embodiments are given by the dependent claims.

A lighting device according to the present invention comprises a housing, a light engine located in the housing with a printed circuit board (PCB) and one or more light emitting diodes (LEDs) arranged on the PCB. An electronic driver is provided for controlling the LEDs. The electronic components of the driver can be arranged on the PCB of the light engine or on one or more additional PCBs which may be electrically connected to the PCB of the light engine. It is also considered to arrange a first set of electronic components of the driver on the PCB of the light engine and a second set (i.e., the remainder) of electronic components of the driver on one or more additional PCBs. Any such additional PCB can be electrically connected to the PCB of the light engine using cables, pin headers, or any other suitable connection element.

The electronic driver is split in two parts, i.e., it comprises a first driver part located at a first position in the housing and a second driver part located at a second position in the housing. The first driver part and the second driver part are electrically connected to each other via a pair of electrically conductive traces on the PCB. In case that some or all of the electronic components of the driver are arranged on one or more separate PCBs (other than the PCB of the light engine), the PCB of the light engine still comprises traces for connecting the two driver parts, and the separate PCBs are connected to the PCB of the light engine as mentioned above.

The lighting device further comprises one or more capacitive devices arranged along the pair of electrically conductive traces on the PCB of the light engine connecting the first driver part and the second driver part. Each of these capacitive devices is connected with a first of its terminals to a first trace of the pair of electrical traces and with a second of its terminals to a second trace of the pair of electrical traces. Using such capacitive devices between the two traces connecting the two driver parts splits the stray inductances and, thus, limits the stray currents. This leads to a reduction of the EMI generated by the lighting device. In addition the stray resonance is shifted towards higher frequencies.

In a preferred embodiment, the housing of the lighting device comprises a first endcap and a second endcap and a translucent (in particular transparent) cover extending at least partially between these two endcaps. In particular, the housing of the lighting device may correspond to a tube lamp. "Extending at least partially" means that the cover may comprise a single part extending between the two endcaps, or that the cover may comprise more than one translucent part, wherein the translucent part are separated by non-translucent parts.

The translucent cover may fully surround the light engine (i.e., over $2\pi$ in a plane perpendicular to the longitudinal axis of the lighting device) or may only cover an angle less than $2\pi$, for example an angle of $\pi$ (i.e., only the half-section into which the LEDs emit light). The first driver part is arranged at least partially in the first endcap and the second driver part is arranged at least partially in the second endcap. "Arranged at least partially" means that some components of the respective driver part may extend into or be arranged in that part of the housing which is located between the two endcaps, preferably in a way that these components are not visible through the translucent cover or at least do not obstruct the light emitted by the LEDs. Splitting the driver between the two endcaps allows to arrange the driver in the housing such that obstruction of the emitted light may be minimized.

In a preferred embodiment of the lighting device, each endcap comprises two electrical contacts arranged at least partially outside the housing for connecting the lighting device to an external power supply. The electrical contacts of one of the two endcaps are electrically connected to corresponding inputs of the electronic driver. Thus, the lighting device can be installed in a luminaire designed for fluorescent tube lamps and be supplied with power by the power supply of the luminaire.

In a preferred embodiment, the electrical contacts of the other of the two endcaps (i.e., the electrical contacts which are not connected the inputs of the driver) are electrically connected to each other via a fuse. Instead of using a fuse, the electrical contacts may also be directly connected.

In a preferred embodiment, at least one of the capacitive devices is a capacitor having a capacitance between about 100 pF and about 100 nF, in particular a capacitance between about 1 nF and 50 nF, further in particular a capacitance of about 10 nF. It is considered that all capacitors have the same capacitance. It is also considered that capacitors with different capacitances (for example, two, three, or more difference capacitance values) are employed. For example, the lighting device may comprise a first group of at least one capacitor having a capacitance of about 10 nF and a second group of at least one capacitor having a capacitance of about 100 pF. The first group of capacitors would help reduce EMI in the frequency range of 9 kHz to 30 MHz, the second group of capacitors would help reduce EMI in the frequency range of 30 MHz to 300 MHz.

It is further preferred that at least one of the capacitors is a surface mounted device (SMD).

In a preferred embodiment, the lighting device comprises 1, 2, 3, 4, or 5 capacitive devices. Any other number of capacitive devices may also be used. A skilled person will be able to determine theoretically and/or experimentally a suitable number of capacitive devices in order to reduce EMI to acceptable levels.

In a preferred embodiment, the electronic driver comprises one of a buck topology and a buck-boost topology. These topologies are especially suitable for driving multiple LEDs as are present in retrofit tube lamps, in particular when operated in boundary conduction mode, i.e. on the boundary between continuous conduction mode and discontinuous conduction mode. Nevertheless, other SMPS topologies may also be employed.

BRIEF DESCRIPTION OF THE DRAWINGS

Preferred embodiments of the invention will be explained in the following, having regard to the drawings. It is shown in.

DETAILED DESCRIPTION OF THE INVENTION

In the following, preferred embodiments of the invention will be described with reference to the drawings. The same or similar elements or elements having the same effect may be indicated by the same reference number in multiple drawings. Repeating the description of such elements may be omitted in order to prevent redundant descriptions.

Figure 1:
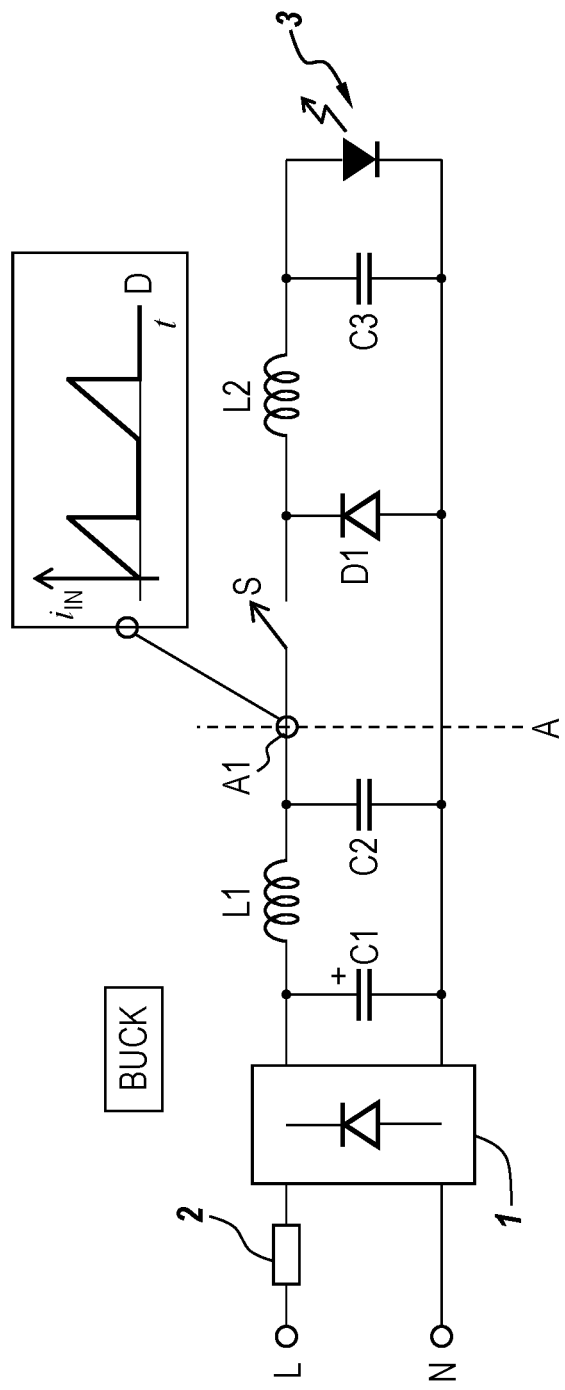
FIG. 1 a schematic circuit diagram of a switched-mode power supply using a buck topology.

FIG. 1 shows a schematic circuit diagram of a switched-mode power supply using a buck topology, in particular a high-side switch buck topology. The two inputs of a rectifier 1 (for example, a full bridge rectifier) can be connected to an external voltage, indicated here as L and N for a mains voltage supply. A fuse 2 is inserted into the connection from the rectifier input to L. A capacitor C1 is connected with its terminals to the outputs of the rectifier 1. An inductor L1 is also connected with one terminal to the positive output of the rectifier 1. A further capacitor C2 is connected with its terminals between the other terminal of the inductor L1 and the negative output of the rectifier 1.

A switching element S (for example, a MOSFET) is connected with one terminal to the connection between inductor L1 and capacitor C2. The control circuit used for controlling the switching element S is not shown in this or the other drawings.

A diode D1 is connected with its cathode to the other terminal of switching element S and with its anode to the negative output of the rectifier 1. An inductor L2 is connected with one terminal to the cathode of the diode D1. A capacitor C3 is connected between the other terminal of the inductor L2 and the negative output of the rectifier 1. The light engine 3 can then be connected to both terminals of the capacitor C3. Depending on the number and specification of the LEDs of the light engine, the LEDs can be connected to each other in series and/or parallel. For the sake of simplicity, the light engine 3 is shown as a single LED in this drawing.

When the buck converter shown in FIG. 1 is operated in boundary conduction mode (as is the usual case in output current regulated driver used for LEDs), highly peaked input currents occur at the point indicated by A1 in the drawing (see schematic insert).

Figure 2:
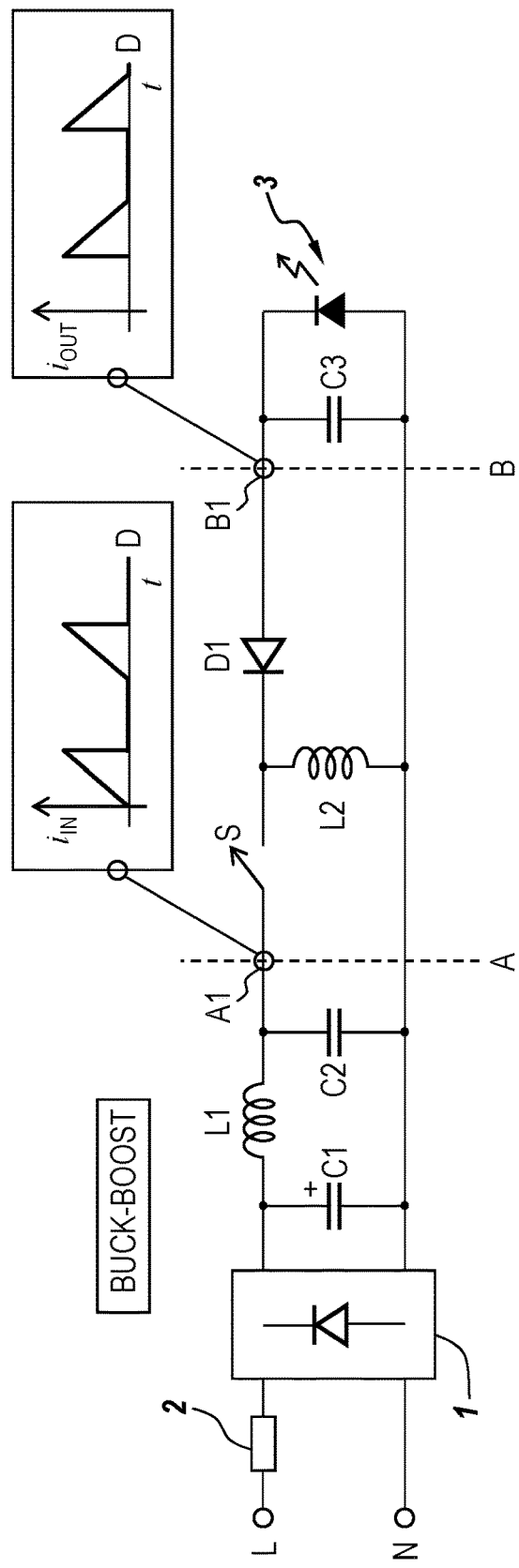
FIG. 2 a schematic circuit diagram of a switched-mode power supply using a buck-boost topology.

FIG. 2 shows a schematic circuit diagram of a switched-mode power supply using a buck-boost topology. The two inputs of a rectifier 1 can be connected to an external voltage, indicated here as L and N for a mains voltage supply. A fuse 2 is inserted into the connection from the rectifier input to L. A capacitor C1 is connected with its terminals to the outputs of the rectifier 1. An inductor L1 is also connected with one terminal to the positive output of the rectifier 1. A further capacitor C2 is connected with its terminals between the other terminal of the inductor L1 and the negative output of the rectifier 1.

A switching element S (for example, a MOSFET) is connected with one terminal to the connection between inductor L1 and capacitor C2.

An inductor L2 is connected with one terminal to the other terminal of switching element S and with its other terminal to the negative output of the rectifier 1. A diode D1 is connected with its cathode to the connection between the switching element S and the inductor L2. A capacitor C3 is connected between the anode of the diode D1 and the negative output of the rectifier 1. The light engine 3 can then be connected to both terminals of the capacitor C3. Depending on the number and specification of the LEDs of the light engine, the LEDs can be connected to each other in series and/or parallel. For the sake of simplicity, the light engine 3 is shown as a single LED in this drawing.

When the buck-boost converter shown in FIG. 2 is operated in boundary conduction mode (as is the usual case in output current regulated driver used for LEDs), highly peaked input currents occur at the point indicated by A1 in the drawing and highly peaked output currents occur at the point indicated by B1 in the drawing (see schematic inserts).

Figure 3:
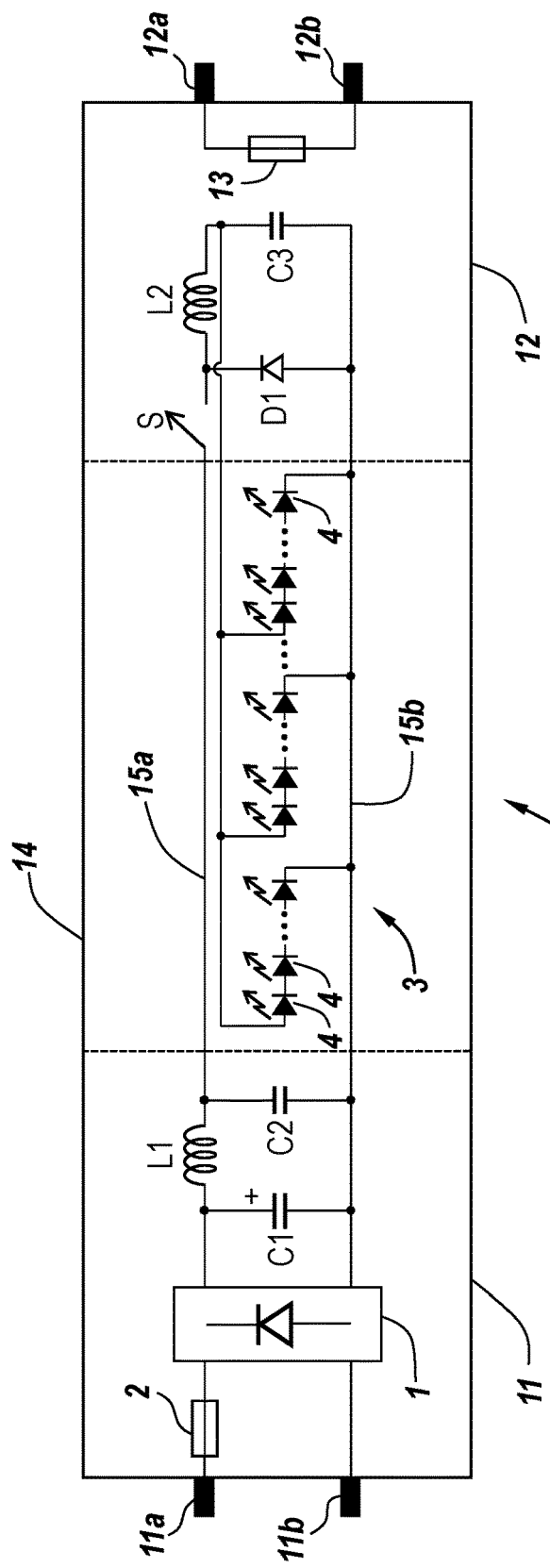
FIG. 3 a schematic drawing of a retrofit tube lamp as known from the prior art.

FIG. 3 shows a schematic drawing of a retrofit tube lamp 10 as known from the prior art. The lamp 10 comprises two endcaps 11, 12 with two electrical contacts 11a, 11b, 12a, 12b in each endcap 11, 12. The electrical contacts 12a, 12b of one of the endcaps 12 are connected to each other via a fuse 13 and, thus, are not used for supplying the lamp 10 with electrical power for operation of the light engine. The two endcaps 11, 12 are mechanically connected by a housing 14 including a translucent, in particular transparent cover over the light engine.

The lamp 10 employs a high-side buck converter as shown in FIG. 1 as a driver for operating the LEDs 4 of the light engine 3. The buck converter is split along line A as shown in FIG. 1 between an input portion and an output portion. The components of the output portion are arranged in the endcap 12 where the electrical contacts 12a, 12b are connected to each other via a fuse 13. The components of the input portion are arranged in the other endcap 11, wherein the electrical contacts 11a, 11b of the endcap 11 are electrically connected to the input of a rectifier 1. A fuse 2 can be used in one of these connections.

The input portion and the output portion of the buck converter are connected to each other via traces 15a, 15b on the PCB carrying the light engine 3.

The light engine 3 includes several LEDs 4 which are arranged in groups. In each group, the LEDs 4 are electrically connected in series. The groups are electrically connected parallel to each other and parallel to the output capacitor C3 of the buck converter.

As has been explained above, when the converter is operated in boundary conduction mode highly peaked input currents occurs at the point where the buck converter is split in an input portion and an output portion. Accordingly, these highly peaked input currents travel along the PCB traces 15a. Due to the presence of stray inductances and stray capacitances along the connecting PCB traces 15a, voltage fluctuations and stray currents can occur which may lead to electromagnetic interference (EMI) which is generally undesirable.

Figure 4:
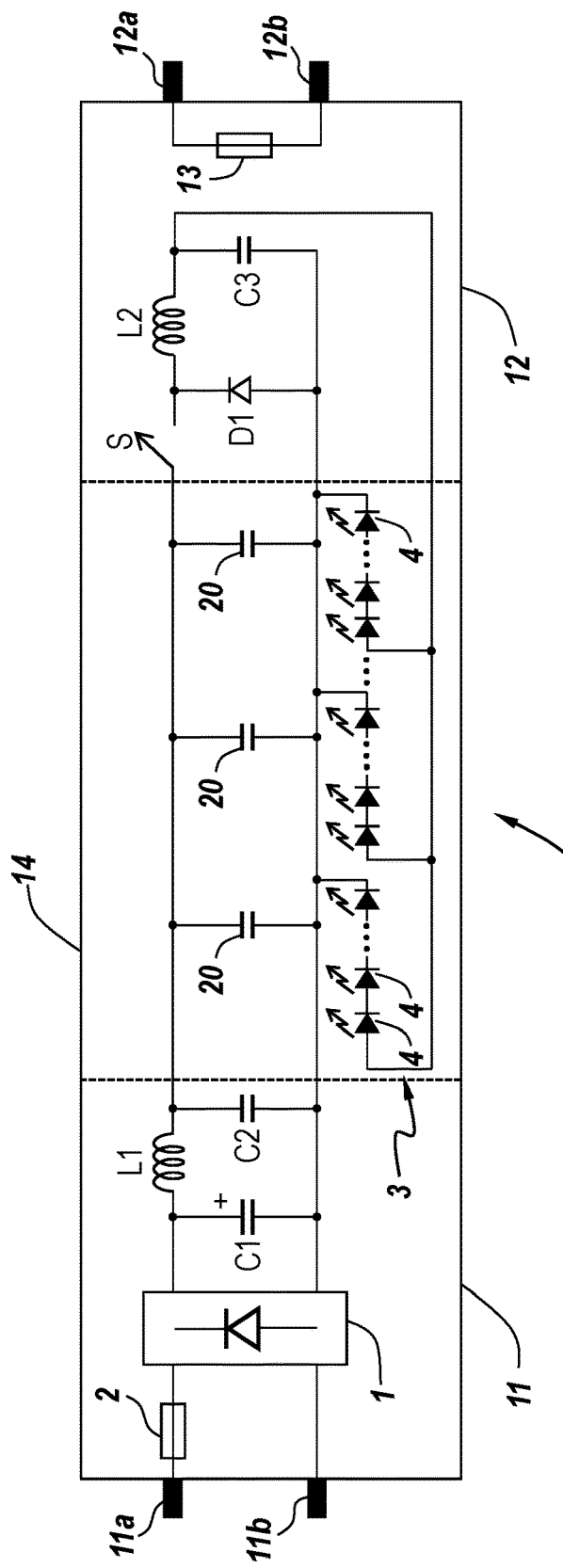
FIG. 4 a schematic drawing of a first embodiment of a retrofit tube lamp according to the present invention.

FIG. 4 shows a schematic drawing of an embodiment of a retrofit tube lamp according to the present invention which reduces the EMI generated by the peaked input currents travelling along the PCB traces connecting the two driver portions. The general construction of the lamp 10 corresponds to the lamp shown in FIG. 3 and is, therefore, not repeated here. The lamp 10 uses a high-side switch buck converter as LED driver.

The embodiment shown in FIG. 4 comprises several capacitors 20 which are each connected with one terminal to one of the PCB traces 15a connecting the two driver portions and with the other terminal to the other of the PCB traces 15b connecting the two driver portions. While FIG. 4 shows three capacitors 20, any number of capacitors 20 (for example, 1, 2, 3, 4, or 5 capacitors 20) may be employed. The capacitors may be SMD capacitors having each a capacitance of about 10 nF.

Introducing the capacitors between the connecting PCB traces 15a, 15b (i.e., one trace 15a with the switching currents and the other trace 15b with a stable potential) splits the stray inductances and thus limits the stray currents. In addition, the stray resonance is shifted towards higher frequencies.

Figure 5:
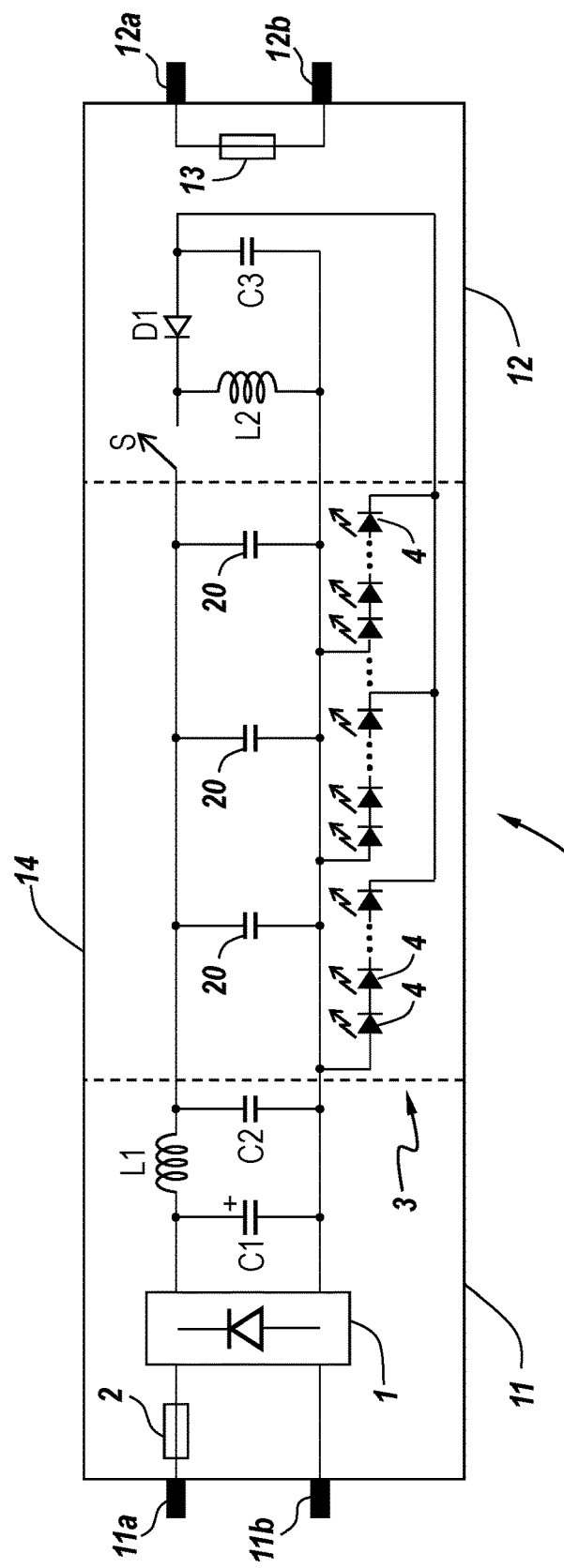
FIG. 5 a schematic drawing of a second embodiment of a retrofit tube lamp according to the present invention.

FIG. 5 shows a schematic drawing of another embodiment of a retrofit tube lamp according to the present invention. The general construction of the lamp 10 is similar to the lamp shown in FIG. 4 and is, therefore, not repeated here. The lamp 10 uses a buck-boost converter as LED driver. The buck-boost converter is split along line B as shown in FIG. 2 between an input portion and an output portion.

The embodiment shown in FIG. 5 comprises several capacitors 20 which are each connected with one terminal to one of the PCB traces 15a connecting the two driver portions and with the other terminal to the other of the PCB traces 15b connecting the two driver portions. While FIG. 5 shows three capacitors 20, any number of capacitors 20 (for example, 1, 2, 3, 4, or 5 capacitors 20) may be employed. The capacitors may be SMD capacitors having each a capacitance of about 10 nF.

Introducing the capacitors 20 between the connecting PCB traces 15a, 15b has the same beneficial effects as describes with reference to FIG. 4.

Although the invention has been illustrated and described in detail by the embodiments explained above, it is not limited to these embodiments. Other variations may be derived by the skilled person without leaving the scope of the attached claims. In particular, while only lamps employing the high-side switch buck and the buck-boost topology for the LED driver have been discussed, other driver topologies (such as low-side switch buck, Sepic, Cuk, Zeta) may be used accordingly.

Splitting the driver circuit into two parts may be carried out at the points shown in the drawings and discussed above. For example, the driver circuit may be split along line A in FIGS. 1 and 2. Alternatively, the driver circuit may be split at another point, for example a buck-boost converter may be split along line B in FIG. 2 resulting in only the output capacitor C3 being arranged separately from the other driver components. Other ways to split the driver are also possible and are included in the scope of the invention as defined by the claims.

Generally, "a" or "an" may be understood as singular or plural, in particular with the meaning "at least one", "one or more", etc., unless this is explicitly excluded, for example by the term "exactly one", etc.

In addition, numerical values may include the exact value as well as a usual tolerance interval, unless this is explicitly excluded.

Features shown in the embodiments, in particular in different embodiments, may be combined or substituted without leaving the scope of the invention.

LIST OF REFERENCE NUMERALS 1 rectifier
2 fuse
3 light engine
4 LED
10 lamp
11, 12 endcaps
11a, 11b 12a, 12b electrical contacts
13 fuse
14 housing
15a, 15b PCB traces connecting the driver portions
20 capacitor

The invention claimed is:

1. A lighting device comprising a housing, a light engine located in the housing with a printed circuit board (PCB) and one or more light emitting diodes (LEDs) arranged on the PCB, and an electronic driver for controlling the LEDs, wherein the electronic driver comprises a first driver part located at a first position in the housing and a second driver part located at a second position in the housing, the first driver part and the second driver part being electrically connected to each other via a pair of electrically conductive traces on the PCB, characterized in that the lighting device further comprises one or more capacitive devices arranged along the pair of electrically conductive traces connecting the first driver part and the second driver part, wherein each capacitive device is connected with a first terminal to a first trace of the pair of electrical traces and with a second terminal to a second trace of the pair of electrical traces such that each capacitive device is configured to reduce electromagnetic interference (EMI) generated by the lighting device during operation.

2. The lighting device according to claim 1, wherein the housing comprises a first endcap and a second endcap and a translucent cover extending at least partially between the first endcap and the second endcap, wherein the first driver part is arranged at least partially in the first endcap and the second driver part is arranged at least partially in the second endcap.

3. The lighting device according to claim 2, wherein each endcap comprises two electrical contacts arranged at least partially outside the housing for connecting the lighting device to an external power supply, wherein the electrical contacts of one of the two endcaps are electrically connected to corresponding inputs of the electronic driver.

4. The lighting device according to claim 3, wherein the electrical contacts of the other of the two endcaps are electrically connected to each other via a fuse.

5. The lighting device according to claim 1, wherein at least one of the one or more capacitive devices is a capacitor having a capacitance of about 10 nF.

6. The lighting device according to claim 1, wherein the one or more capacitive devices comprise 1, 2, 3, 4, or 5 capacitive devices.

7. The lighting device according to claim 1, wherein the electronic driver comprises one of a buck topology and a buck-boost topology.

8. The lighting device according to claim 1, wherein the electronic driver comprises one of a single-ended primary-inductor converter (SEPIC) topology, a auk topology, and a zeta topology.

9. The lighting device according to claim 1, wherein in being configured to reduce EMI generated by the lighting device, the one or more capacitive devices are configured to at least one of:
split stray inductances formed along the pair of electrically conductive traces;
limit stray currents along the pair of electrically conductive traces; and
shift stray resonance toward a higher frequency.

10. The lighting device according to claim 1, wherein the one or more capacitive devices comprise a plurality of capacitors of the same capacitance.

11. The lighting device according to claim 1, wherein the one or more capacitive devices comprise:
at least one capacitor of a first capacitance; and
at least one capacitor of a second capacitance that differs from the first capacitance.

12. The lighting device according to claim 11, wherein:
the first capacitance is about 10 nF; and
the second capacitance is about 100 pF.

13. The lighting device according to claim 11, wherein the at least one capacitor of the first capacitance is configured to reduce EMI of a frequency in the range of 9 kHz-30 MHz.

14. The lighting device according to claim 11, wherein the at least one capacitor of the second capacitance is configured to reduce EMI of a frequency in the range of 30 MHz-300 MHz.

15. The lighting device according to claim 1, wherein at least one of the one or more capacitive devices is a capacitor having a capacitance in the range of about 100 pF-100 nF.

16. The lighting device according to claim 1, wherein at least one of the one or more capacitive devices is a capacitor having a capacitance in the range of about 1 nF-50 nF.

17. The lighting device according to claim 1, wherein the one or more LEDs comprise multiple groups of LEDs.

18. The lighting device according to claim 17, wherein within each group of LEDs, the constituent LEDs are electrically connected in series.

19. The lighting device according to claim 17, wherein the groups of LEDs are electrically connected in parallel with each other.

20. The lighting device according to claim 17, wherein the groups of LEDs are electrically connected in parallel with an output capacitor of the electronic driver.

* * * * *

UNITED STATES PATENT AND TRADEMARK OFFICE
CERTIFICATE OF CORRECTION

PATENT NO. : 10,317,016 B2  
APPLICATION NO. : 15/865411  
DATED : June 11, 2019  
INVENTOR(S) : Orestis Polychronakis Page 1 of 1

It is certified that error appears in the above-identified patent and that said Letters Patent is hereby corrected as shown below:

In the Claims

Column 8, Claim 8, Line 3, "auk" should be -- Ćuk --

Signed and Sealed this  
Twenty-sixth Day of November, 2019

Andrei Iancu  
*Director of the United States Patent and Trademark Office*